United States Patent [19]

Rieck et al.

[11] Patent Number: 4,806,327

[45] Date of Patent: Feb. 21, 1989

[54] PROCESS FOR THE PREPARATION OF CRYSTALLINE SHEET-TYPE ALKALI METAL SILICATES

[75] Inventors: Hans-Peter Rieck, Hofheim am Taunas; Martin Schott, Steinbach/Taunus, both of Fed. Rep. of Germany

[73] Assignee: Hoechst Aktiengesellschaft, Frankfurt am Main, Fed. Rep. of Germany

[21] Appl. No.: 872,942

[22] Filed: Jun. 11, 1986

[30] Foreign Application Priority Data

Jun. 13, 1985 [DE] Fed. Rep. of Germany ....... 3521227
Jun. 29, 1985 [DE] Fed. Rep. of Germany ....... 3523364

[51] Int. Cl.$^4$ ............................................. C01B 33/32
[52] U.S. Cl. ..................................... 423/332; 423/333; 423/DIG. 5; 23/295 R; 23/300; 23/302 T
[58] Field of Search ............... 423/325, 330, 332, 333, 423/DIG. 5; 23/300, 302 T

[56] References Cited

U.S. PATENT DOCUMENTS

| | | | |
|---|---|---|---|
| 4,528,172 | 7/1985 | Rieck et al. | 423/332 |
| 4,578,258 | 3/1986 | Rieck | 423/332 |
| 4,578,371 | 3/1986 | Rieck et al. | 423/306 |
| 4,581,213 | 4/1986 | Rieck | 423/332 |
| 4,581,217 | 4/1986 | Shinpo et al. | 423/339 |
| 4,585,642 | 4/1986 | Rieck | 423/332 |

OTHER PUBLICATIONS

Leon McCullich, *J. Amer. Chem. Soc.*, 74, 2453-2456 (1952), "A New Highly Silicious Soda-Silica Compound".

Klaus Beneke et al., *American Mineral*, 68, 818-826 (1983), "Kenyaite-Synthesis and Properties".

*Primary Examiner*—Anthony McFarlane

[57] ABSTRACT

A process for the preparation of a crystalline sheet-type alkali metal silicate is described, in which an aqueous solution of an alkali metal silicate or a suspension of an amorphous alkali metal silica having a molar ratio $M_2O$ (unneutralized)/$SiO_2$, where M represents an alkali metal, of 0.05:1 to 0.8:1 is allowed to react at temperatures of 70° to 250° C. until the sheet-type alkali metal silicate crystallizes out. After the beginning of crystallization, an acidic compound is added in an amount such that an $M_2O$ (unneutralized)/$SiO_2$ ratio of 0.05:1 to 0.8:1 is constantly maintained in the mother liquor of a filtered sample. However, at least an amount corresponding to 5 milliequivalents of $H^+$ per mole of $SiO_2$ in the alkali metal silicate used is added. The use of seed crystals of the desired sheet silicate is advantageous.

10 Claims, 1 Drawing Sheet

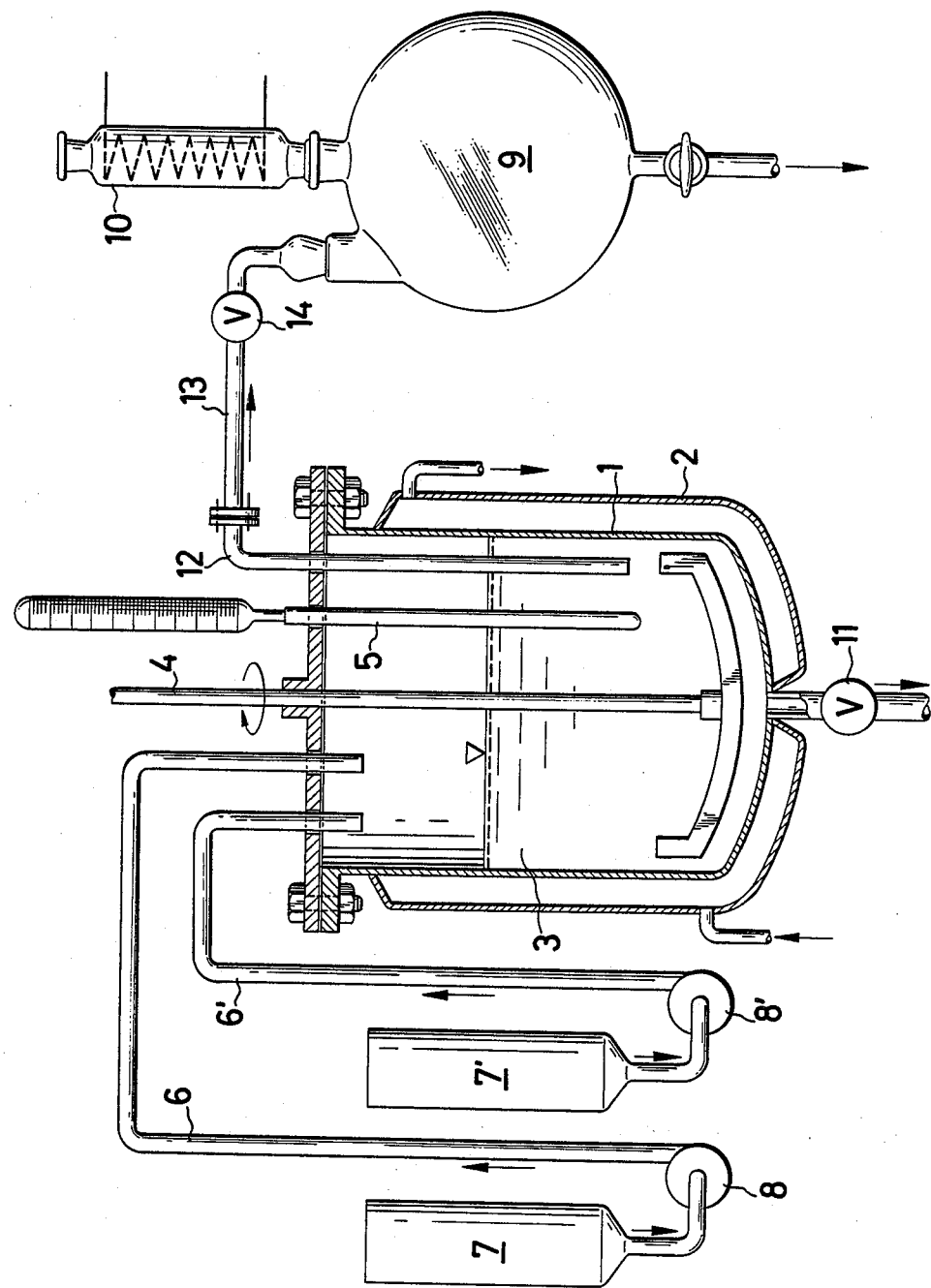

PROCESS FOR THE PREPARATION OF CRYSTALLINE SHEET-TYPE ALKALI METAL SILICATES

FIELD OF THE INVENTION

The invention relates to a process for the preparation of crystalline alkali metal silicates, having a sheet structure, in an aqueous medium, in particular of silicate-rich sheet-type alkali metal silicates having an $SiO_2$/alkali metal oxide ($M_2O$) molar ratio of about 8:1 to about 23:1.

DESCRIPTION OF THE PRIOR ART

In addition to water-soluble alkali metal silicates (having a low $SiO_2$/alkali metal oxide ratio) and sparingly soluble amorphous alkali metal silicates, crystalline alkali metal silicates are also known. In the case of these silicates, a distinction can be made between silicates having a three-dimensional framework structure (for example zeolites, which are free of aluminum or at least have a low aluminum content) and silicates having a two-dimensional sheet structure, which is crystallographically called a layer-structure.

Some crystalline alkali metal silicates having a sheet structure are found in nature, and some have been produced synthetically. The alkali metal silicates having a sheet structure, in particular the sodium and potassium salts, are usually synthesized from silica gel, silicasol or precipitated silica, with the addition of an alkali metal hydroxide, in an aqueous system. An appropriate carbonate solution is sometimes used instead of an alkali metal hydroxide solution. The amount of alkali to be added depends on the desired product.

A desirable process for the industrial scale is one which permits such sheet-type alkali metal silicates to be prepared in high yield, but nevertheless operates with short reaction times.

For the preparation of silicate-rich layer-type alkali metal silicates, German Offenlegungsschrift No. 3,400,132 proposes treating an alkali metal silicate with an acidic compound in an aqueous medium until an alkali metal oxide(unneutralized)/$SiO_2$ molar ratio of 0.05:1 to 0.239:1 results, and allowing the sheet silicate to crystallize out from this reaction mixture.

SUMMARY OF THE INVENTION

A process for the preparation of a crystalline sheet-type alkali metal silicate has now been found, in which an aqueous solution of an alkali metal silicate or a suspension of an amorphous alkali metal silicate, having a molar ratio of $M_2O$(unneutralized)/$SiO_2$, where M represents an alkali metal, of 0.05:1 to 0.8:1, is kept at temperatures of 70° to 250° C., and this reaction mixture is allowed to react until the sheet-type alkali metal silicate has crystallized out. "Unneutralized $M_2O$" is understood as meaning the alkali which is not bound by an (added) acid, with the exception of alkali which is present as soluble silicate. The value for "unneutralized $M_2O$" can be determined if the filtered reaction solution is neutralized with acid to pH 7. In the process, an acidic compound is added, after the beginning of crystallization, in an amount such that an $M_2O$(unneutralized)/$SiO_2$ ratio of 0.05:1 to 0.8:1 is constantly maintained in the mother liquor or filtered sample, but at least in an amount of 5 milliequivalents of $H^+$/mole of $SiO_2$ of the alkali metal silicate employed. The pH value of the filtered sample should be higher than 9.0.

BRIEF DESCRIPTION OF THE DRAWING

The sole FIGURE illustrates an apparatus used in the process of the invention.

DETAILED DESCRIPTION OF THE INVENTION

The starting material used is sodium waterglass or potassium waterglass having an $SiO_2$ content of 22 to 37%. Sodium waterglass having an $SiO_2$ content of about 22 to 37% and an $Na_2O$ content of 5 to 18% as well as $Al_2O_3$ content of less than 0.5% is particularly preferred. This is an alkali metal silicate dissolved in water. A sodium waterglass containing 22 to 30% by weight of $SiO_2$ and 5 to 9% by weight of $Na_2O$ can advantageously be used. Amorphous alkali metal silicates, in particular solid sodium silicates and potassium silicates, which may furthermore be anhydrous but are soluble in water, at least at the selected reaction temperature, may also be used. If the $M_2O$/$SiO_2$ molar ratio of the starting material is too high (e.g. if mother liquor which is very alkaline is recycled), some of the $M_2O$ can be neutralized with an acidic compound, and the stated molar ratio in the starting material reduced.

The acidic compound added may be an anhydride or an acidic salt, such as sodium bisulfate. However, free organic or inorganic acids, in particular phosphoric acid or sulfuric acid, are particularly preferred. Amorphous precipitated silica together with an alkali metal hydroxide in the stated molar ratio may also be used as the starting material.

The $M_2O$/$H_2O$ ratio in the starting solution is not critical. A high $M_2O$/$H_2O$ ratio is more economical, but may promote the formation of impurities to some extent; the molar composition of the crystalline product too is affected to some extent by the $M_2O$/$H_2O$ ratio. High $M_2O$/$H_2O$ ratios promote the formation of silicate-rich types (for example $Na_2Si_{22}O_{45}$).

The $M_2O$(unneutralized)/$SiO_2$ molar ratio is monitored constantly, for example by elemental analysis of the filtered mother liquor. Where M is Na and the acidic compound is sulfuric acid, $M_2O$ (unneutralized) is obtained as the difference between the concentration of $Na_2O$ (total) and the concentration of sulfate. The pH value and the density of the mother liquor also provide information. Without the addition of acid, the molar ratio to be checked would increase at the rate at which silicate-rich sheet-type alkali metal silicates crystallize out. The end product formed virtually always has a lower $M_2O$/$SiO_2$ ratio than the reaction mixture from which it is formed. In the end products, the $M_2O$/$SiO_2$ ratio is between about 1:8 and 1:22. Even after the addition of the acidic compound, the pH value is in general greater than 9.

It is particularly advantageous if an $M_2O$(unneutralized)/$SiO_2$ molar ratio of 0.1:1 to 0.5:1 is maintained in the reaction solution by adding acid. Moreover, the pH value should not fall below 9. In the case of a lower ratio, the rate of crystallization decreases. For molar ratios above 0.1:1, there is hardly any danger of $SiO_2$ (quartz) also separating out as an impurity. Furthermore, in the molar range from 0.1:1 to 0.5:1, the desired crystalline alkali metal silicates are obtained rapidly and in good yield. Fairly substantial departures from the stated molar range may result in cristobalite and tridymite too occurring as undesired by-products. The crystalline sheet-type alkali metal silicates prepared by the process according to the invention have an $SiO_2/M_2O$ ratio greater than 8:1.

Typical end products which can be obtained by the process according to the invention are the sheet silicates of the formula $Na_2Si_{22}O_{45} \cdot xH_2O$, a compound corresponding to the kenyaite type and designated as Na-SKS-1 below, and the compound $Na_2Si_{14}O_{29} \cdot xH_2O$, a compound corresponding to natural magadiite and referred to as Na-SKS-2 below. In the formulae below, any water content present in the silicates is not mentioned specially. Synthetic sheet-type sodium silicates of the kenyaite type were prepared in 1983 on a Laboratory scale by Lagaly (K. Benecke and G. Lagaly, Americ. Mineral, (1983) 68, 818) and those of the megadiite type were prepared in 1952 on a laboratory scale by McCulloch (L. McCulloch, J. Am. Chem. Soc. 74 (1952), 2453).

The time at which crystallization begins, which is important with regard to the addition, according to the invention, of the acidic compound, is determined by suitable preliminary experiments, in which samples are taken and the solid present is determined by X-ray analysis. This applies in particular when amorphous sodium silicate suspended in water is used. When the reflections in the X-ray diffraction pattern indicate the presence of an adequate amount of crystalline sheet-type sodium silicate, the acidic compound may be added.

The acidic compound may be added all at once (in the case of high $M_2O$(unneutralized)/$SiO_2$ molar ratio), but is preferably added continuously. The addition of the acidic compound in individual portions is also possible. It is advantageous to extend the period during which the acidic compound is added so that it amounts to up to 9 times the period between heating of the reaction mixture and the beginning of crystallization.

It is advantageous, with regard to the uniformity of the end product, if a constant $M_2O$(unneutralized)/$SiO_2$ molar ratio is always maintained by the addition of an acid from the beginning of crystallization until the end of the reaction.

The acidic compound is added in an amount of at least 5 milliequivalents of $H^+$/mole of $SiO_2$ of the alkali metal silicate used. This amount is preferably added as soon as possible after the sheet-type alkali metal silicate begins to crystallize out, the $M_2O$(unneutralized)/$SiO_2$ molar ratio chosen before the beginning of crystallization just being kept constant in this case by the addition of the acidic compound. Using the process according to the invention, it is possible to prepare relatively pure products or mixtures of crystalline sheet-type alkali metal silicates. Where the starting materials have relatively high aluminum contents, zeolite byproducts, generally of the ZSM-5 type or of the mordenite type, may form. On the other hand, a low aluminum content, as is present in, for example, technical-grade waterglass, presents no problems. Amorphous silica is observed in relatively large amounts in the reaction mixture only in the case of short reaction times, and quartz only in the case of long reaction times. The sheet-type alkali metal silicates obtainable by the process according to the invention undergo cationic exchange and are familiar to the skilled worker.

In addition to the alkali metal ions (lithium, sodium and potassium), other metal ions may also be present during the synthesis, for example germanium, aluminum, indium, arsenic and antimony, as well as the non-metals boron and phosphorus. Where the amount of these components is smaller than 10%, based on the alkali metal content, the synthesis is not significantly affected. In order to prepare a pure sheet-type alkali metal silicate, it is advantageous if the addition of foreign metals during the synthesis is dispensed with. The process according to the invention can also be carried out in the presence of small amounts of organic compounds; however, it is preferably effected without any organic compound.

Until the beginning of crystallization of sheet-type alkali metal silicate, the reaction temperature is 70° to 250° C. Thereafter, the reaction temperature may be 70° to 300° C., in particular 90° to 270° C. and preferably 130° to 230° C. Temperatures of 150° to 210° C., in particular 200° to 210° C., are particularly preferred.

The reaction time depends on the reaction temperature. It may be less than 1 hour or a few months. The optimum reaction time for the selected reaction temperature can be determined by taking samples at various times during the reaction and subjecting them to investigation by X-ray diffraction. It is preferable to carry out the reaction until at least 70 mol percent of the alkali metal silicate used are converted to the sheet-type alkali metal silicate. Shorter reaction times, high reaction temperatures and low $M_2O$(unneutralized)/$SiO_2$ ratios promote the formation of sheet silicates having a low alkali content (M/Si atomic ratio of 1:8 to 1:12). Short reaction times, low reaction temperatures and high alkali metal/Si ratios promote the formation of alkali-rich sheet silicates (M/Si atomic ratio about 1:4 to 1:7).

For the synthesis of Na-SKS-1, temperatures of 195° to 210° C. and reaction times of not more than 6 hours are preferred. For the synthesis of Na-SKS-2, reaction temperatures of 160° to 190° C. and reaction times of not more than 15 hours are preferred. The addition of seed crystals has a substantial effect on the nature of the crystallizing sheet silicate.

In this case too, reaction times of less than 15 hours are advantageous for the formation of the compound Na-SKS-2 ($Na_2Si_{14}O_{29}$), and reaction times of less than 6 hours are advantageous for the formation of the compound Na-SKS-1 ($Na_2Si_{22}O_{45}$). To prepare the compounds $M_2Si_{22}O_{45}$ it is advantageous if $M_2O$(unneutralized)/$SiO_2$ molar ratios of 0.09:1 to 0.17:1 are initially maintained after the beginning of crystallization.

The reaction is preferably carried out in a pressure vessel, with thorough stirring. The addition of seed crystals is advantageous since they improve the purity of the product and reduce the reaction time. However, the procedure may also be carried out without seed crystals.

In the batchwise reaction procedure, the amount of seed crystals can be up to 30% by weight, based on the $SiO_2$ content of the added amorphous alkali metal silicate dissolved or suspended in water. Added amounts of seed crystals of less than 0.01% by weight have no detectable effect. Where it is desired to accelerate crystallization and to obtain pure products, it is therefore reasonable to incorporate at least 0.5% by weight of seed crystals (based on the $SiO_2$ content of the alkali metal silicate added) into the reaction mixture, at the start and optionally in addition thereafter. Instead of adding seed crystals, it may be sufficient if small residual amounts of a previous batch remain in the reaction vessel. In the continuous reaction procedure, substantially higher concentrations of crystal nuclei (in steady-state equilibrium) have proven advantageous. Such concentrations can readily be achieved in this case by recycling some of the reaction product. Sheet-type sodium silicates, in particular the compounds Na-SKS-1 (kenyaite type) and Na-SKS-2 (magadiite type), are also used as seed crystals. The seed crystals have a typical composition depending on the crystal type (apart from impurities). The composition of the sheet-type sodium silicate which crystallizes out corresponds substantially to the composition of the seed crystal added.

The process according to the invention can be carried out batchwise, semicontinuously and continuously in apparatuses possessing flow-tube, stirred-kettle or cascade chracteristics. The semicontinuous preparation of crystalline sheet-type alkali metal silicate in a stirred kettle will be described in detail below. Since the reaction temperature is generally above 100° C., the procedure has to be carried out in an autoclave. Further increasing the pressure by adding an inert gas has no advantages. The temperature of the reaction mixture should be in the range from 70° to 250° C., in particular 130° to 210° C., even during the addition of the reaction components. This is particularly easily achieved if the substances to be added have already been heated. The pressure in the reaction vessel should be below 100 bar, in general in the range from 1 to 30 bar. Where the pressure in the stirred kettle is above 1 bar, pumps are required for metering in the reaction components. Preferably, the acidic compounds and the basic reaction components (alkali metal silicates, sodium hydroxide) are metered in separately.

The starting materials can be added one after the other, but are preferably added simultaneously. Where a plurality of reaction kettles in series are employed, it is advantageous if the time over which each component is added is appropriately adapted, and in particular the time for the addition of each component is 10 to 100%, in particular 20 to 80%, of the residence time in the first stirred kettle.

If the product is not removed simultaneously during the addition, the content of the stirred vessel increases. The addition must then be terminated no later than when the maximum level is reached. The reaction which takes place after the sheet silicate begins to crystallize out, the so-called "after-crystallization", can, if necessary, take place in a second vessel. The after-crystallization should be carried out with stirring. The duration of the after-crystallization (with the addition of an acidic compound to maintain the desired molar ratio) should correspond to no more than 100 times, preferably no more than 10 times, the mean residence time in the first stirred kettle. By using a plurality of kettles, it is possible to carry out the after-crystallization at lower temperatures than in the first stirred kettle. The acidic compound is introduced into either the first or the downstream reaction kettle, depending on the residence time and the temperature.

In a semicontinuous or batchwise reaction procedure, it is advantageous if the autoclave or autoclaves are not completely emptied, but the procedure is always carried out with small amounts of a previous product mixture. In this way, it is always possible to achieve an approximately constant content of seed crystals.

If the product is to be removed from the autoclave while the latter is still under pressure, this can be achieved by means of an appropriate discharge valve in the bottom. If complete emptying is not desired, the product is advantageously removed via a riser tube which dips into the reaction mixture and is closed by means of a valve. The maximum amount of product which can be removed, and the number of seed crystals which remain behind, are determined by the length of the riser tube.

The process according to the invention is advantageously carried out by a continuous method. In addition to the continuous feed of the starting components (for example, alkali metal silicate and acidic compounds), continuous discharge of the reaction products is necessary for this purpose. This too can be effected by means of, for example, a riser tube. To monitor the reaction vessel, it is advantageous to check the level by means of a level indicator or by measuring the total weight of the apparatus. Both in batchwise operation and in the continuous procedure, generally for economic reasons, the reaction time is such that at least 10%, advantageously, however, more than 70%, of the added alkali metal silicate is converted to sheet-type alkali metal silicate. At higher reaction temperatures, shorter reaction times are required. For example, for the preparation of Na-SKS-1, times of less than 1 hour are sufficient at temperatures above 200° C. Since the yields increase more and more slowly as the reaction time increases, it may be advisable, for economic reasons, not to continue to the maximum yields but to be content with shorter residence times and lower yields.

To isolate the sheet silicate, the reaction mixture is filtered after the reaction. The filtrate can be employed in the next batch, in place of water. Especially in this variant the molar ratio $Na_2O:SiO_2$ may be in the range of 0,239:1 to 0,8:1. If the total amount of mother liquor is to be reused, some of the water is evaporated off from the mother liquor (for example in the flash vessel), so that the amount of water in the circulation remains constant. After several reactions, the salt content becomes so high that some of the salt crystallizes out during the reaction or during evaporation of the water. The process in which mother liquor is circulated is particularly advantageous if the sheet silicate produced is to be employed in detergents. In this case, sulfuric acid is used as the acidic reactant, and the sodium sulfate formed can also be used in the detergent. In this case, it is also possible to dispense with washing and drying of the filter cake. If, on the other hand, a product free of accompanying salts is required, the filter cake is washed with water or dilute alkali metal hydroxide solution (corresponding to the alkali metal silicate prepared) and, if required, is dried. However, it may also be advantageous for some further processing operations if the filter-moist product is further processed directly. Thus, the alkali metal ions can be replaced with H ions (with formation of sheet-type silicic acids by treatment with hydrochloric acid, or other cations can be introduced by treatment with akali metal salt solutions. These cations may be, for example, monovalent or divalent metal ions, as well as alkylammonium ions containing 1-4 alkyl radicals. The alkali metal silicates prepared by the process according to the invention can be used as adsorption agents, analogously to the silicates of German Pat. No. 2,742,912.

Another very interesting field of use for sheet-type alkali metal silicates is in the detergent sector. Here, they are used for fabric softening, directly of after being laden with organic amines (German Offenlegungsschrift No. 3,416,669 and German Offenlegungsschrift No. 3,416,472). Sheet silicates which have been modified with organic substances are capable of binding substantial amounts of organic compounds, such as, for example, fats or plasticizers.

They are therefore outstandingly suitable as additives to detergents, for reinforcing the washing process, or as a depot for organic compounds (German Offenlegungsschrift No. 3,434,709).

The sheet-type alkali metal silicates or sheet silicas (SKS) may furthermore be converted to moldings, some of which also possess catalytic activity (German Offenlegungsschrift No. 3,426,389). After calcination, moldings having a scristobalite or tridymite structure are obtained (U.S. patent application Ser. No. 793,562).

The invention is illustrated in detail by the examples.

EXAMPLE 1

(A) Experimental Apparatus

The apparatus used is shown in the figure. It is essentially a stainless steel stirred autoclave (1) for laboratory operation. It has a net volume of about 2 l and an internal diameter of about 14 cm and a maximum internal height of 17.5 cm. This vessel can be heated by means of the heating mantle (2), which is usually filled with oil. The reaction mixture (3) prepared in the stirred autoclave is mixed by means of the stirrer (4), and different stirring speeds can be set. The internal temperature is monitored using a thermometer in the thermometer sleeve (5).

Temperature measurement is used for regulating the oil temperature in order to ensure a constant temperature in the stirred autoclave. The starting materials are initially taken in the stock vessels (7) and (7'). These starting materials are fed to the stirred autoclave with the aid of pumps (8) and (8'), via the lines (6) and (6'). Vessel (7) contains technical-grade waterglass (diluted with water), and the other vessel (7') contains the acidic compound (concentrated phosphoric acid).

The amount added, and hence the duration of addition, can be controlled by setting the stroke and frequency of the pumps. The feed lines are closed by valves. For safety reasons, the stirred autoclave is furthermore equipped with a manometer and also with a safety valve. (The manometer, the safety valve and the individual valves are not shown in the drawing).

When each experiment is complete, the reaction mixture is discharged via the outlet valve (11) in the bottom. The product is filtered off, and is washed with water and dried in the air, these steps being carried out in a conventional manner.

When the autoclave is to be only partially emptied, in particular during continuous operation, the product is discharged via the riser tube (12) and the line (13). This line (13) is provided with a valve (14). The product can be discharged in portions or continuously by appropriately controlling this valve (14). It is forced into the pressure equilibration vessel (9), which is provided with a reflux condenser (10) for condensing the steam. The vessel (9) is emptied in portions or continuously.

(B) Experimental Procedure

A reaction mixture having the following molar ratio is prepared: $Na_2O:SiO_2:H_2O = 0.303:1:30$. It furthermore contains, as an impurity, 0.0052 mole of $Al_2O_3$ per mole of $SiO_2$. This reaction mixture is prepared by mixing 1015 g of sodium waterglass composed of 27% of $SiO_2$ and 8.43% of $Na_2O$ (0.1% of $Al_2O_3$ as an impurity, $Na_2O:SiO_2$ molar ratio 0.03:1) with 960 g of water, and adding 10 g of a crystalline sheet-type sodium silicate (Na-SKS-1) from a previous experiment as seed crystals. Concentrated phosphoric acid is then added batchwise to this mixture, the total amount added being 0.753 mole. About one third of this, i.e. 0.251 mole, is added at a relatively early stage during the beginning of the reaction. The $Na_2O$(unneutralized):$SiO_2$ molar ratio is then 0.26:1. The remaining 0.502 mole is added only after crystallization begins. The reaction mixture is brought to the desired temperature of about 205° C. in the course of 1–1½ hours in the autoclave described. Small samples are then removed via the discharge valve (11) and are investigated by X-ray analysis. During continuous routine production, it may be possible to dispense with this expensive testing procedure. Crystallization begins when the intensity of the X-ray diffraction lines exhibited by the sample and specific to the desired sheet silicates increases, since further amounts of this sheet silicate form. After the beginning of crystallization, the remaining amounts of acid, namely 0.251 mole in each case, are added in two further portions about 1 hour apart, the $Na_2O$(unneutralized):$SiO_2$ molar ratio being 0.22 after the first addition. As a result of incipient crystallization of the end product, the ratio of $Na_2O$ (unneutralized) to $SiO_2$ in the (filtered) solution increases, and is 0.34:1 after the addition of the final portion of acid. At this point, conversion to the end product has reached 55% of theory (based on $SiO_2$ employed). The remaining amounts of acid can alternatively be added continuously.

After a total of 3 hours, the total amount of product is discharged via (11), and worked up as described. During discharge and when the first sample is taken, the pH of this mixture is checked. It is approximately in the range from 11.5 to 11.7. After the usual working up procedure, a yield of about 82% (based on $SiO_2$ employed) of the desired sheet silicate is obtained in this experiment. The product obtained corresponds to kenyaite. The $SiO_2/Na_2O$ ratio of the product is 22, and the $H_2O/Na_2O$ ratio is in the region of 4. The formula $Na_2Si_{22}O_{45}.4 H_2O$ is therefore approximately applicable.

The corresponding free sheet silicate in the H form can be obtained from this by ion exchange with strong mineral acids.

Under similar conditions, but using seed crystals of the magadiite type (Na-SKS-2), it is also possible to obtain a product which has an $SiO_2:Na_2O$ ratio of about 14.0:1. This corresponds approximately to the composition of magadiite determined by elemental analysis. For this synthetic sheet silicate and also for the sheet silicate found in nature, Lagaly et al. (American Mineral. 60, 642–649 (1975) give an $SiO_2:Na_2O$ ratio of about 13.4 to 14.4:1, determined by elemental analysis (Na-SKS-2). The X-ray diffraction patterns of the pure sheet silicates (Na-SKS-1 and Na-SKS-2) are shown in the table.

TABLE

| X-ray diffraction patterns: | | | |
|---|---|---|---|
| Na—SKS-1 | | Na—SKS-2 | |
| d ($10^{-8}$ cm) | I/Io | d ($10^{-8}$ cm) | I/Io |
| 20.5 | 56 | 15.5 | 100 |
| 10.0 | 11 | 7.76 | 13 |
| 7.31 | 4 | 5.15 | 20 |
| 4.99 | 13 | 4.69 | 8 |
| 3.64 | 22 | 4.44 | 10 |
| 3.52 | 31 | 4.23 | 7 |
| 3.44 | 100 | 3.63 | 18 |
| 3.34 | 46 | 3.54 | 24 |
| 3.21 | 53 | 3.44 | 79 |
| 2.94 | 16 | 3.30 | 40 |
| 2.94 | 16 | 3.14 | 65 |
| | | 2.81 | 11 |
| | | 2.48 | 8 |

TABLE-continued

| X-ray diffraction patterns: | | | |
|---|---|---|---|
| Na—SKS-1 | | Na—SKS-2 | |
| d ($10^{-8}$ cm) | I/Io | d ($10^{-8}$ cm) | I/Io |
| | | 2.34 | 6 |

EXAMPLE 2

(A) Experimental Apparatus

The apparatus used is a pilot-scale apparatus which corresponds in structure to the laboratory apparatus employed in Example 1. A stirred autoclave having a maximum capacity of 250 l is surrounded by a heating mantle which is heated with high-pressure steam. The temperature in the kettle and the pressure in the kettle and in the heating mantle are monitored. The desired temperature in the stirred vessel can be set by regulating the vapor pressure in the heating mantle. The vessel can be emptied both under atmospheric pressure, via the discharge valve in the base, and under pressure, via a riser tube and a downstream pressure equilibration vessel. The reaction product is filtered using vacuum filters.

(B) Experimental Procedure 125.3 kg of sodium waterglass containing 8.3% of $Na_2O$ and 27.8% of $SiO_2$ are introduced into the reaction kettle. This corresponds to 167.65 moles of $Na_2O$ and 580.51 moles of $SiO_2$, i.e. a molar ratio of 0.289:1. The water glass is diluted with 120 kg of water. Thereafter, 1 kg of synthetic kenyite (from a previous experiment) is added. 7.4 kg of a 96% strength sulfuric acid (=72.49 moles) are added with vigorous stirring. The reaction mixture is heated to 205° C. in the course of about 1 hour with further vigorous stirring. The molar ratio of (unneutralized) $Na_2O$ to $SiO_2$ is 0.164:1 after this first addition of the acid. Within about half an hour crystallization begins. A further 2.59 kg of the 96% strength sulfuric acid (=25.37 moles) are then pumped in. The molar ratio of $Na_2O$ (unneutralized) to $SiO_2$ is then 0.12. As a result of crystallization of the end product, which now takes place rapidly, the content of $SiO_2$ in the mother liquor decreases, and consequently the ratio of $Na_2O$ (unneutralized) to $SiO_2$ increases sharply. After the reaction has continued for a further hour at 205° C., the experiment is terminated, and the product is forced over into the pressure equilibration vessel. At this point, the ratio of $Na_2O$ (unneutralized) to $SiO_2$ in the mother liquor is 0.565. After the product has been filtered off, washed and dried at 120° C., it corresponds to the formula $Na_2Si_{22}O_{45}\cdot 4H_2O$. The yield (based on $SiO_2$ employed) is 85.6%.

EXAMPLE 3

(A) Experimental Apparatus

The experimental apparatus is the same as in Example 2.

(B) Experimental Procedure

In the stirred kettle, 83.5 kg of the same sodium waterglass as in Example 2 are mixed with 150 l of water. 4.93 kg of a 96% strength sulfuric acid (=48.3 moles) are added. The ratio of $Na_2O$ (unneutralized) to $SiO_2$ is then 0.164:1. 0.6 kg of synthetic magadiite (from a previous batch) is then stirred in. The mixture is heated to 165° C., after which samples are taken in order to monitor the course of crystallization. Crystallization begins after about 2 hours. A further 4.83 moles of $H_2SO_4$ are then added. The ratio of $Na_2O$ (unneutralized) to $SiO_2$ is then 0.155:1. The reaction is carried out at 165° C. for a total of 17 hours. At the end, the ratio of $Na_2O$ (unneutralized) to $SiO_2$ in the mother liquor is 0.45. The stirred kettle is emptied as in Example 2, and the reaction product is worked up as described there. The product obtained has the magadiite structure. The yield is 79.1% (based on $SiO_2$ employed).

We claim:

1. Process for the batchwise preparation of a crystalline layered alkali metal silicate, in which a batch comprising an aqueous solution of an alkali metal silicate or a suspension of an amorphous alkali metal silicate having a molar ratio $M_2O$((unneutralized)/$SiO_2$, where M represents an alkali metal, of 0.05:1 to 0.8:1 is kept at temperatures of 70° to 250° C., and this batch of reaction mixture is allowed to react until the alkali metal silicate crystallizes out, therein, after the beginning of crystallization an acidic compound is added in an amount such that an $M_2O$(unneutralized)/$SiO_2$ ratio of 0.05:1 to 0.8:1 is constantly maintained from the beginning of crystallization until the end of the reaction in the mother liquor of a filtered sample, but at least in an amount corresponding to 5 milliequivalents of $H^+$ per mole of $SiO_2$ in the alkali metal silicate employed.

2. The process as claimed in claim 1, wherein the time during which the acidic compound is added is up to 9 times the time which elapses between heating up and the beginning of crystallization.

3. The process as claimed in claim 1, wherein the reaction is carried out until at least 70 mol percent of the alkali metal silicate used have been converted to the layered alkali metal silicate.

4. The process as claimed in claim 1, wherein seed crystals of layered alkali metal silicate are added to the batch of reaction mixture after crystallization has begun.

5. The process as claimed in claim 4, wherein seed crystals of the formula $Na_2Si_{14}O_{29}$ are added.

6. The process as claimed in claim 5 wherein the layered alkali metal silicate has the formula $Na_2Si_{14}O_{29}$ and wherein a total reaction time between heating up and filtering off the layered alkali metal silicate thus formed, is less than 18 hours, and said reaction is carried out in the temperature range of from 160° to 190° C.

7. The process as claimed in claim 4, wherein seed crystals of the formula $Na_2Si_{22}O_{45}$ are added.

8. The process as claimed in claim 7 wherein the layered alkali metal silicate has the formula $Na_2Si_{22}O_{45}$ wherein the reaction proceed for a total time of less than 6 hours, and said reaction is carried out in the temperature range of from 195° to 210° C.

9. The process as claimed in claim 1, wherein, when the reaction is complete, the layered silicate thus formed is separated off from the mother liquor, and the latter is used as a diluent, solvent or both for a further batch of reaction batch mixture.

10. The process as claimed in claim 9, wherein the mother liquor is partially evaporated down before being used further.

* * * * *